US 11,558,549 B2

(12) United States Patent
Lu et al.

(10) Patent No.: US 11,558,549 B2
(45) Date of Patent: Jan. 17, 2023

(54) METHODS AND DEVICES FOR CAPTURING HIGH-SPEED AND HIGH-DEFINITION VIDEOS

(71) Applicant: Huawei Technologies Co., Ltd., Guangdong (CN)

(72) Inventors: Juwei Lu, North York (CA); Wei Li, North York (CA); Jin Tang, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 17/159,984

(22) Filed: Jan. 27, 2021

(65) Prior Publication Data
US 2021/0152739 A1 May 20, 2021

Related U.S. Application Data

(63) Continuation of application No. PCT/CN2018/109359, filed on Oct. 8, 2018.

(51) Int. Cl.
*H04N 5/232* (2006.01)
*G06T 7/207* (2017.01)
*H04N 5/783* (2006.01)

(52) U.S. Cl.
CPC ........ *H04N 5/23232* (2013.01); *G06T 7/207* (2017.01); *H04N 5/23222* (2013.01); *H04N 5/783* (2013.01)

(58) Field of Classification Search
CPC .. H04N 5/2323; H04N 5/23222; H04N 5/783; H04N 5/23232; H04N 5/91; G06T 7/207
See application file for complete search history.

(56) References Cited

U.S. PATENT DOCUMENTS 11,356,604 B2 * 6/2022 Woodall ............... H04N 5/2625
2007/0189386 A1 8/2007 Imagawa et al.
(Continued)

FOREIGN PATENT DOCUMENTS

CN 102685364 A 9/2012
CN 103379351 A 10/2013
(Continued)

OTHER PUBLICATIONS

International Search Report and Written Opinion of PCT/CN2018/109359 dated Jul. 1, 2019.
(Continued)

*Primary Examiner* — Antoinette T Spinks

(57) ABSTRACT

Methods and devices for generating a slow motion video segment are described. A first set of video frames captures a video view at a first resolution and at a first frame rate. A second set of video frames captures the video view at a second lower resolution, and at a second frame rate that is greater for at least a portion of the second set. At least two high resolution frames are identified in the first set for generating the slow motion video segment. One or more low resolution frames are identified in the second set corresponding to an inter-frame time period between the identified high resolution frames. The slow motion video segment is generated by generating at least one high resolution frame corresponding to the inter-frame time period using interpolation based on the identified high resolution frames and the identified low resolution frames.

20 Claims, 6 Drawing Sheets

(56) References Cited

U.S. PATENT DOCUMENTS

2010/0040344 A1   2/2010  Mizuno et al.
2012/0207386 A1   8/2012  Ofek et al.
2018/0359455 A1   12/2018  Kuriyama

FOREIGN PATENT DOCUMENTS

| CN | 104010127 A | 8/2014 |
| --- | --- | --- |
| CN | 104469146 A | 3/2015 |
| CN | 107041168 A | 8/2017 |
| CN | 107113416 A | 8/2017 |
| CN | 107396019 A | 11/2017 |
| GB | 2264020 A | 8/1993 |
| JP | 2003203237 A | 7/2003 |

OTHER PUBLICATIONS

Hajime Nagaharat et al., High-resolution Video Generation Using Morphing, The 18th International Conference on Pattern Recognition (ICPR''06), 2006, 4 pages.

\* cited by examiner

METHODS AND DEVICES FOR CAPTURING HIGH-SPEED AND HIGH-DEFINITION VIDEOS

RELATED APPLICATIONS

This application is a continuation of PCT/CN2018/109359 filed Oct. 8, 2018, the entirety of which is incorporated herein by reference.

FIELD

The present disclosure is related to methods and devices for capturing high-speed and/or high-definition videos. The present disclosure is further related to methods and devices for generating high-speed and high-definition videos using interpolation.

BACKGROUND

In conventional video capture devices, a user typically has to manually pre-set a high-speed or a slow-motion mode to capture high-speed or slow-motion videos. However, such conventional devices may have drawbacks.

In a typical conventional video capture device, when recording with high-speed or slow-motion modes (e.g., capturing video at a frame rate of 240 FPS), the size of the generated video is significantly increased due to the increase in number of frames, thus requiring more memory and/or image processing resources. As well, the time captured in the video is typically dominated by low-speed content, and high-speed motions often happen in a very short period. Accordingly, a video that is captured using a high-speed or slow-motion mode may contain mostly frames having low-speed content (where the high-speed or slow-motion mode is not required), resulting in a significant waste of video storage resources.

Conventional video capture devices may require the user to manually set the desired shooting mode. This may result in missing details of some unexpected and quickly occurring moments, for example when capturing video of a soccer game, because the user had chosen to record the video using a normal video mode (e.g., capturing video at a typical frame rate of 30 FPS). Further, given a video recorded in a standard frame rate (e.g., 30 FPS), technically it is typically very difficult or even impossible to create slow-motion for any segment in the video by post-processing.

As a result, it is desirable to provide a solution that is able to more effectively capture video at high-speed and/or enable generation of slow-motion video for a video segment in post-processing.

SUMMARY

The examples described herein may enable generation of slow motion video for a video segment in post-processing, and may help to reduce the video storage size for a high-definition, high-speed video.

Examples of the disclosed methods and devices implement a two-channel (e.g., dual camera) video capture approach, in which one channel captures video at a low resolution (e.g., low definition video) and another channel captures video at a high resolution (e.g., high definition video). At least a portion of the low definition video is captured at a frame rate that is greater than a frame rate at which the high definition video is captured. The present disclosure describes various examples that may adaptively adjust the speed of video capture while recording a video. The adjustment of capture speed may be based on the motion of one or more in-focus objects, for example.

Examples of the disclosed methods and devices enable generation of slow motion video by interpolation using a set of frames of the high definition video that was captured at a low frame rate, and a set of frames of the low definition video captured at least partly at a high frame rate.

In some examples, the disclosed methods and devices may be implemented using more than two cameras and/or more than two sets of video frames.

In some aspects/embodiments, the present disclosure describes a device for generating a slow motion video segment. The device includes a memory storing a first set of video frames and a second set of video frames. The first set captures a video view at a first resolution and at a first frame rate and the second set captures the video view at a second resolution, lower than the first resolution, and at a second frame rate, the second frame rate being greater than the first frame rate for at least a portion of the second set. The device also includes a processor coupled to the memory and configured to execute computer-readable instructions to cause the device to, in response to instructions to generate the slow motion video segment: identify at least two high resolution frames in the first set for generating the slow motion video segment; identify whether there is at least one low resolution frame in the second set corresponding to an inter-frame time period between the identified at least two high resolution frames; and when there is at least one low resolution frame corresponding to the inter-frame time period, generate the slow motion video segment by generating at least one high resolution frame corresponding to the inter-frame time period using interpolation based on the identified at least two high resolution frames and the at least one low resolution frame. The device also includes an output device coupled to the processor for displaying the slow motion video segment using the at least one generated high resolution frame.

In any of the preceding aspects/embodiments, the processor may be further configured to execute instructions to cause the device to generate the at least one high resolution frame using a linear interpolation.

In any of the preceding aspects/embodiments, the instructions to generate the slow motion video segment may include an indication of a time period for generating the slow motion video segment, and the processor may be further configured to execute instructions to cause the device to identify the at least two high resolution frames by identifying at least two frames in the first set spanning the indicated time period.

In any of the preceding aspects/embodiments, the device may also include a first camera for capturing the first set of video frames; and a second camera for capturing the second set of video frames. The processor may be coupled to the first and second cameras to control operation of the first and second cameras. The first and second cameras may be provided on a same side of the device.

In any of the preceding aspects/embodiments, the second frame rate may be a variable frame rate. The processor may be further configured to execute instructions to cause the device to: estimate a speed of motion of an object in the video view; and control the second frame rate to be greater than the first frame rate when the estimated speed meets or exceeds a speed threshold.

In any of the preceding aspects/embodiments, the processor may be further configured to execute instructions to cause the device to vary the second frame rate based on the estimated speed.

In any of the preceding aspects/embodiments, the second frame rate may be a variable frame rate that is higher than the first frame rate for a portion of the second set.

In any of the preceding aspects/embodiments, the second frame rate may be substantially constant for all of the second set of video frames.

In any of the preceding aspects/embodiments, the first and second sets of video frames may be stored in the memory in association with each other.

In any of the preceding aspects/embodiments, the memory may further store a third set of video frames. The third set may capture the video view at a third resolution and at a third frame rate, the third resolution being lower than the second resolution, and the third frame rate being greater than the second frame rate for at least a portion of the third set. The processor may be further configured to execute instructions to cause the device to: generate the slow motion video segment recursively by: generating a set of intermediate slow motion video frames, having an intermediate resolution, using the second and third sets of video frames; and generating the slow motion video segment using the set of intermediate slow motion video frames and the first set of video frames.

In some aspects, the present disclosure provides a method for generating a slow motion video segment. The method includes: obtaining a first set of video frames capturing a video view at a first resolution and at a first frame rate; obtaining a second set of video frames capturing the video view at a second resolution, lower than the first resolution, and at a second frame rate, the second frame rate being greater than the first frame rate for at least a portion of the second set; in response to instructions to generate the slow motion video segment: identifying at least two high resolution frames in the first set for generating the slow motion video segment; identifying whether there is at least one low resolution frame in the second set corresponding to the inter-frame time period between the identified at least two high resolution frames; when there is at least one low resolution frame corresponding to the inter-frame time period, generating the slow motion video segment by generating at least one high resolution frame corresponding to the inter-frame time period using interpolation based on the identified at least two high resolution frames and the at least one low resolution frame; and providing the at least one generated high resolution frame to an output device to display the slow motion video segment.

In any of the preceding aspects/embodiments, the interpolation may be a linear interpolation.

In any of the preceding aspects/embodiments, the instructions to generate the slow motion video segment may include an indication of a time period for generating the slow motion video segment, and identifying the at least two high resolution frames may include identifying at least two frames in the first set spanning the indicated time period.

In any of the preceding aspects/embodiments, the method may also include capturing the first set of video frames using a first camera; and capturing the second set of video frames using a second camera. The first and second cameras may be provided on a same side of a video capture device.

In any of the preceding aspects/embodiments, the second frame rate may be a variable frame rate. Capturing the second set of video frames may include: estimating a speed of motion of an object in the video view; and controlling the second frame rate to be greater than the first frame rate when the estimated speed meets or exceeds a speed threshold.

In any of the preceding aspects/embodiments, the second frame rate may be varied based on the estimated speed.

In any of the preceding aspects/embodiments, the second frame rate may be a variable frame rate that is greater than the first frame rate for a portion of the second set.

In any of the preceding aspects/embodiments, the second frame rate may be substantially constant for all of the second set of video frames.

In any of the preceding aspects/embodiments, the method may also include storing the first and second sets of video frames in a memory in association with each other.

In any of the preceding aspects/embodiments, the method may also include: obtaining a third set of video frames, the third set capturing the video view at a third resolution and at a third frame rate, the third resolution being lower than the second resolution, and the third frame rate being greater than the second frame rate for at least a portion of the third set; in response to instructions to generate the slow motion video segment: generating the slow motion video segment recursively by: generating a set of intermediate slow motion video frames, having an intermediate resolution, using the second and third sets of video frames; and generating the slow motion video segment using the set of intermediate slow motion video frames and the first set of video frames.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In various examples described herein, a two-channel (e.g., dual camera) video capture approach is disclosed, in which one channel captures low definition video and another channel captures high definition video. At least a portion of the low definition video is captured at a greater frame rate than the high definition video. Using this approach, high-definition and high-speed videos may be captured with lower use of resources (e.g., processing power and memory), compared with conventional video capture devices.

In the present disclosure, "low definition video" refers to video captured at a low resolution, such that the low definition video contains low resolution video frames. A low resolution frame may have a resolution on the order of 100 s×100 s pixels (e.g., 320×240 pixels, 480×320 pixels, or 640×480). Low definition videos may also be referred to as standard definition videos or SDTV, and low resolution video frames may also be referred to as standard resolution video frames, for example. In the present disclosure, "high definition video" refers to video captured at a high resolution, such that the high definition video contains high resolution video frames. A high resolution frame may have a resolution on the order of 1000 s×1000 s pixels (e.g., 1280×720 pixels, or 1920×1080 pixels). High definition video may also be referred to as 720p, 1080i, 1080p, HDTV, or ultra-high definition video, for example. Generally, the low definition video and high definition video referred to in the present disclosure may be considered "low definition" and "high definition" relative to each other. That is, the low definition video has a resolution that is lower than the resolution of the high definition video.

In the present disclosure, the frame rate refers to the rate or frequency at which video frames are captured, usually measured by frames per second (FPS). A high frame rate may have a rate on the order of 100 s FPS or 1000 s FPS (e.g., 200-500 FPS, up to 960 FPS, or higher). High frame rate video may also be referred to as high-motion video. A low frame rate may have a rate on the order of 10 s FPS (e.g., 24-30 FPS, or lower), and may be as low as 1 FPS. In some cases, 0 FPS may be considered to be an extreme end of what may be considered to be a low frame rate. A low frame rate may also be referred to as a standard frame rate or normal frame rate, for example when the frame rate is in the range of about 24-30 FPS. Generally, the high frame rate and low frame rate referred to in the present disclosure may be considered "high frame rate" and "low frame rate" relative to each other. That is, the high frame rate video frames are captured at a greater FPS than the low frame rate video frames.

Examples described herein also enable generation of slow motion for any video segment in post-processing, even when the user does not select to record the video using a slow motion or high speed mode.

Figure 1:
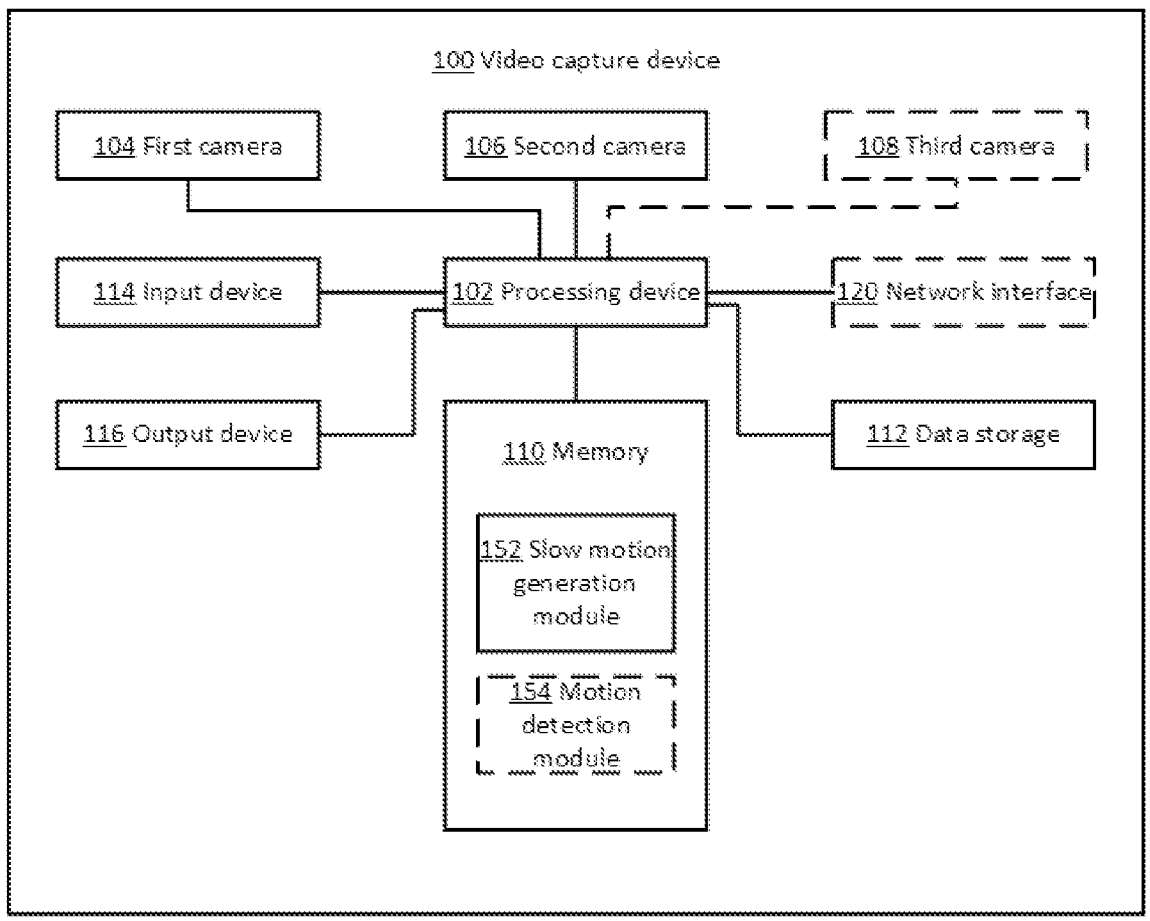
FIG. 1 is a block diagram of an example video capture device, in accordance with embodiments of the present disclosure.

FIG. 1 is a block diagram of an example video capture device 100, in accordance with embodiments of the present disclosure. For example, the video capture device 100 may be implemented as stand-alone device such as a digital camera, a surveillance camera, or a digital video camera or may be implemented in any suitable electronic device, such as a smartphone, desktop computer, laptop computer or other device having video capturing capabilities, including handheld devices and self-driving devices (e.g., autonomous vehicles). In some examples, the video capture device 100 may have other capabilities in addition to video capture, such as wireless communications. Other devices may also be suitable for implementing embodiments of the present disclosure, and which may include components different from those described with respect to FIG. 1. For example, embodiments of the present disclosure may be implemented as a sub-system within an electronic device, such as a camera sub-system within a smartphone or laptop computer. Although FIG. 1 shows a single instance of each component, there may be multiple instances of each component in the video capture device 100.

The video capture device 100 may include one or more processing devices 102, such as a processor, a microprocessor, an application-specific integrated circuit (ASIC), a field-programmable gate array (FPGA), a dedicated logic circuitry, or combinations thereof. The processing device(s) 102 may include an image signal processor (ISP) and/or a central processing unit (CPU), for example.

The video capture device 100 may include a first camera 104 and a second camera 106. The first and second cameras 104, 106 may be configured to both capture a video of the same video view (e.g., both cameras 104, 106 being provided on the same side of the video capture device 100). Each camera 104, 106 may be operated to capture a respective first and second set of video frames, which may be stored separately (e.g., as separate files) or together (e.g., as a single file). The first and second videos each comprises a set of video frames. In the present disclosure, a video view refers to the field(s)-of-view (FOV(s)) or scene(s) captured in a video, and there may be multiple FOVs or scenes within a single continuous video view (e.g., in a panning video). Each of the first and second cameras 104, 106 may be independently controlled to capture video at different resolutions, frame rates, focus depths and/or other video capture parameters. In some examples, each cameras 104, 106 may be used alone. In some examples, the first and second cameras 104, 106 may be used together. Although referred to in the present disclosure as first and second cameras 104, 106, the first and second cameras 104, 106 may also be referred to as first and second image sensors or first and second lenses.

In some examples, the video capture device 100 may include one or more additional cameras, such as optional third camera 108, which may also be configured to capture the same video view as the first and second cameras 104, 106. In some examples, the video capture device 100 may include one or more additional cameras (not shown) configured to capture a different view (e.g., being provided on a different side of the video capture device 100).

The video capture device 100 may include one or more memories 110 which may include a physical memory such as a volatile or non-volatile memory (e.g., a flash memory, a random access memory (RAM), and/or a read-only memory (ROM)). The memory(ies) 110 may store instructions for execution by the processing device(s) 102, such as to control operation of the first and second cameras 104, 106 (and optional third camera 108), and to carry out the methods described in the present disclosure. For example, the memory(ies) 110 may include a slow motion generation module 152, which may include instructions used by the processing device(s) 102 to generate a slow motion video segment from sets of captured video frames, as discussed further below. The memory(ies) 110 may also include an optional motion detection module 154, which may include instructions used by the processing device(s) 102 to detect and/or predict the occurrence of high speed motion during capture of a video, also discussed further below.

The memory(ies) 110 may include other software instructions, such as for implementing an operating system (OS), modules and other applications/functions. In some examples, one or more data sets and/or modules may be provided by an external memory (e.g., an external drive in wired or wireless communication with the video capture device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The video capture device 100 may also include one or more data storages which may include a mass storage unit such as a solid state drive, a hard disk drive, a magnetic disk drive and/or an optical disk drive. The data storage(s) 112 may be used to store video captured by the first and second cameras 104, 106 (and optional third camera 108), for example. In some examples, one or both of the memory(ies) 110 and the data storage(s) 112 may include a data buffer, for temporary storage of video data for example.

The video capture device 100 may also include one or more input devices 114 (e.g., a keyboard, a mouse, a microphone, a touchscreen, and/or a keypad) and output devices 116 (e.g., a display, a touchscreen, a speaker and/or a light emitting diode (LED)). In some examples, a single component (e.g., a touchscreen) may serve as both input device 114 and output device 116. Input from a user may be received via the input device(s) 114 and communicated to the processing device(s) 102. Similarly, the processing device(s) 102 may communicate output to be provided to the user via the output device(s) 116. Although the input device(s) 114 and the output device(s) 116 are shown in this example as being part of the video capture device 100, in other examples the input device(s) 114 and/or the output device(s) 116 may be external to the video capture device 100, and such external device(s) may communicate with the video capture device 100 via an optional I/O interface (not shown).

The video capture device 100 may include one or more optional network interfaces 120 for wired or wireless communication with a network (e.g., an intranet, the Internet, a P2P network, a WAN and/or a LAN, and/or a Radio Access Network (RAN)) or other node. The network interface(s) 120 may include one or more interfaces to wired networks and wireless networks. Wired networks may make use of wired links (e.g., Ethernet cable). To enable wireless communication, the video capture device 100 may include one or more optional antennas (not shown).

In some examples of the present disclosure, the first and second cameras 104, 106 are used together to capture different sets of video frames for the same video view. The first camera 104 may be operated to capture high definition video comprising a first set of high resolution video frames at a low frame rate, and the second camera 106 may be operated to capture low definition video comprising a second set of video frames at least partly at a high frame rate. The high and low definition videos may be stored, associated with each other, as a single file or as separate files. The video frames of the high and low definition videos may be used in post-processing to generate a slow motion video segment, for example. Such post-processing may emulate capturing a video in high-speed and high-definition.

Figure 2:
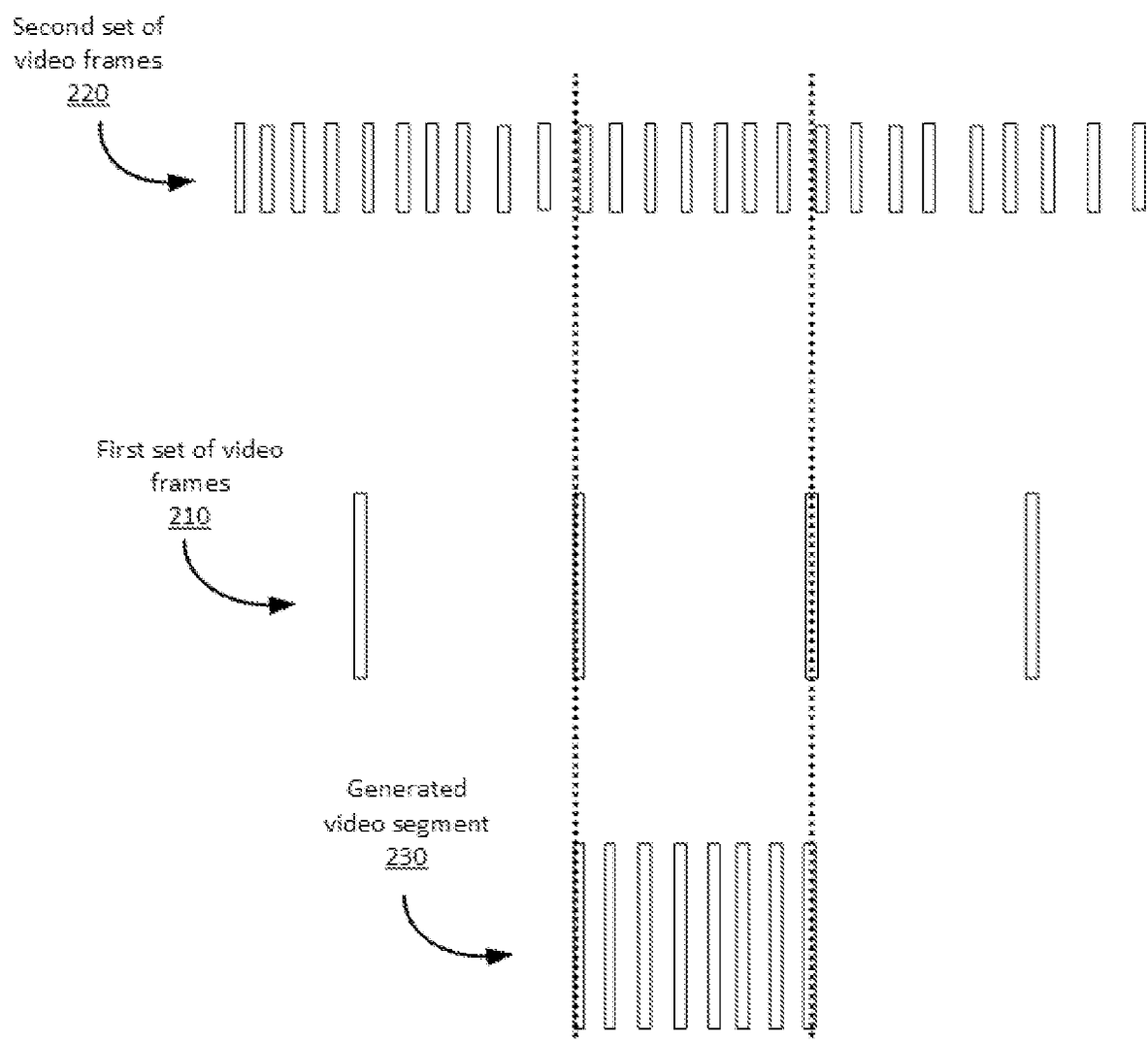
FIG. 2 is a diagram illustrating an example of generating a slow motion video segment by interpolation using a first set of high resolution, low frame rate captured video frames, and a second set of low resolution, high frame rate captured video frames.

FIG. 2 is a diagram illustrating an example of how a slow motion video segment may be generated from a first video comprising a first set of video frames and a second video comprising a second set of video frames. The slow motion video segment may be generated by the video capture device 100, for example from the first and second videos captured using the first and second cameras 104, 106, respectively, and using instructions stored in the slow motion generation module 152. The first set 210 of video frames of the first video captures the video view at a first resolution and at a first frame rate. The first video may have been captured by the first camera 104, for example. The second set 220 of video frames of the second video captures the same video view at a second resolution and, in this example, at a second frame rate. The first set 210 may be the full set of video frames of a captured high definition video, or may be portion of the captured video (i.e., a subset of the total frames of the video); similarly, the second set 220 may be the full set of video frames of a low definition video, or may be a portion of the captured video. For simplicity, the present disclosure will refer to the first set 210 and the second set 220, however it should be understood that the term "set" is intended to encompass a subset. The resolution of the frames of the second set 220 is lower than the resolution of the frames of the first set 210, but the frame rate of the second video is greater than the frame rate of the first video. For example, the first video may be captured at 1080p or Full HD mode and at a frame rate of 24-30 FPS, and the second video may be captured at SDTV mode and at a frame rate of 960 FPS.

A slow motion video segment 230 may be generated by interpolating between at least two of the high resolution frames in the first set 210. The frame rate of the generated slow motion video segment 230 may be the same as or different from the frame rate of the second set 220. For example, the generated video segment 230 may have a frame rate significantly greater than the second set 220. The generated slow motion video segment 230 may or may not cover the full time period between the two high resolution frames (also referred to herein as the inter-frame time period). If the user has selected to generate a slow motion video segment that does not cover the full inter-frame time period, it may not be necessary to interpolate the full inter-frame time period; however, in some cases it may be useful to interpolate over a time period longer than the user-selected time period, for example in order to produce a smoother interpolation. FIG. 2 shows interpolation being performed between two frames of the first set 210. In some examples, such as depending on user selection, interpolation may be performed over more than two frames of the first set 210, for example where the user-selected time period is spanned by more than two frames of the first set 210. In such cases, interpolation may be performed between pairs of adjacent high resolution frames, or interpolation may be performed based on more than two high resolution frames. Any suitable interpolation methods may be used to generate the slow motion video segment 230. Suitable interpolation techniques may include, for example, use of linear interpolation, use of artificial intelligence (AI), use of filter(s), or combinations thereof, among other suitable techniques.

Interpolation has been used in conventional video post-processing, in order to emulate actually capturing a video segment in high-speed and high-definition, using high definition video captured at normal speed. The challenge with such conventional post-processing is that, when interpolating between two sequential frames captured at normal frame rates (e.g., in the range of about 24-30 FPS), for example, the interpolation is performed without information about any motion during the time period between the two frames. Any fast motion that occurs only during that time period is not captured in any of the high resolution, normal speed frames and thus cannot be reproduced by interpolation.

In the present disclosure, generation of the slow motion video segment 230 is based on not only the first set 210 of high resolution, low frame rate (e.g., normal speed, such as 24-30 FPS) video frames, but is also based on the second set 220 of low resolution, high frame rate video frames. The second set 220 of video frames may provide information about motion that occurs between adjacent pairs of high resolution frames, and may thus enable improved interpolation compared to conventional techniques.

The following discussion provides an example of how the first set 210 of high resolution, low frame rate video frames and the second set 220 of low resolution, high frame rate video frames may be used together to generate a set of high resolution, high frame rate video frames, for example using linear interpolation. It should be understood that the following calculations are provided for the purpose of illustration and are not intended to be limiting. Other interpolation techniques may be used. The slow motion generation module 152, for example, may provide instructions for performing interpolation technique discussed below, or other suitable interpolation technique.

Let $I_t(x,y)$ be the pixel value at the location (x,y) in a video frame at time t for a slow motion frame to be generated. Let $I_{t_1}$ and $I_{t_2}$ be the two nearest high resolution frames (identified from the first set 210) around time t with $t_1 \leq t \leq t_2$. Let $J_{t_3}$ and $J_{t_4}$ be the two nearest low resolution frames (identified from the second set 220) around time t with $t_3 \leq t \leq t_4$, and $\hat{J}_{t_3}$ and $\hat{J}_{t_4}$ be the upscaled (to the same size as $I_t$) versions of $J_{t_3}$ and $J_{t_4}$ respectively. $I_t(x,y)$ can be estimated by temporal and spatial subpixel interpolation using the following example equation:

$$I_t(x,y) = \partial_1 \cdot I_{t_1}(x - \Delta x_1, y - \Delta y_1) + \partial_2 \cdot I_{t_2}(x - \Delta x_2, y - \Delta y_2) + \partial_3 \cdot \hat{J}_{t_3}(x - \Delta x_3, y - \Delta y_3) + \partial_4 \cdot \hat{J}_{t_4}(x - \Delta x_4, y - \Delta y_4)$$

where $(\Delta x_1, \Delta y_1)$, $(\Delta x_2, \Delta y_2)$, $(\Delta x_3, \Delta y_3)$ and $(\Delta x_4, \Delta y_4)$ are the translations of (x, y) during the time period of $(t_1-t)$, $(t_2-t)$, $(t_3-t)$, and $(t_4-t)$, respectively, and $\partial_1, \partial_2, \partial_3, \partial_4$ are the combination weights. For example, a frame nearer to time t may be given a larger weight. One example is as follows:

$$\partial_1 = \beta \cdot \frac{t_2 - t}{t_2 - t_1}$$

$$\partial_2 = \beta \cdot \frac{t - t_1}{t_2 - t_1}$$

$$\partial_3 = (1 - \beta) \cdot \frac{t_4 - t}{t_4 - t_3}$$

$$\partial_4 = (1 - \beta) \cdot \frac{t - t_3}{t_4 - t_3}$$

where $\beta \subset [0,1]$ is a weight that may be set to adjust the impact of the high resolution and low resolution video frames, where a higher value of β gives more weight to the high resolution video frames. The value of β may be preset (e.g., by user selection) and/or may be dynamically controlled. For example, an interpolation algorithm (e.g., implemented using the slow motion generation module 152) may perform machine learning in order to adjust β, or may adjust β based on characteristics of the video. One possible way to adjust β based on the video may be for the interpolation algorithm to apply a higher value of β (i.e., giving greater weight to the high resolution, low frame rate video frames) when the detected motion speed in the video is lower, and a lower value of β (i.e., giving greater weight to the low resolution, high frame rate video frames) when the detected motion speed in the video is higher.

The generated set of slow motion video frames is then the set of $I_t$ for all t of interest (e.g., according to the time period selected for generating the slow motion video segment, and according to the desired frame rate of the generated video).

Figure 3:
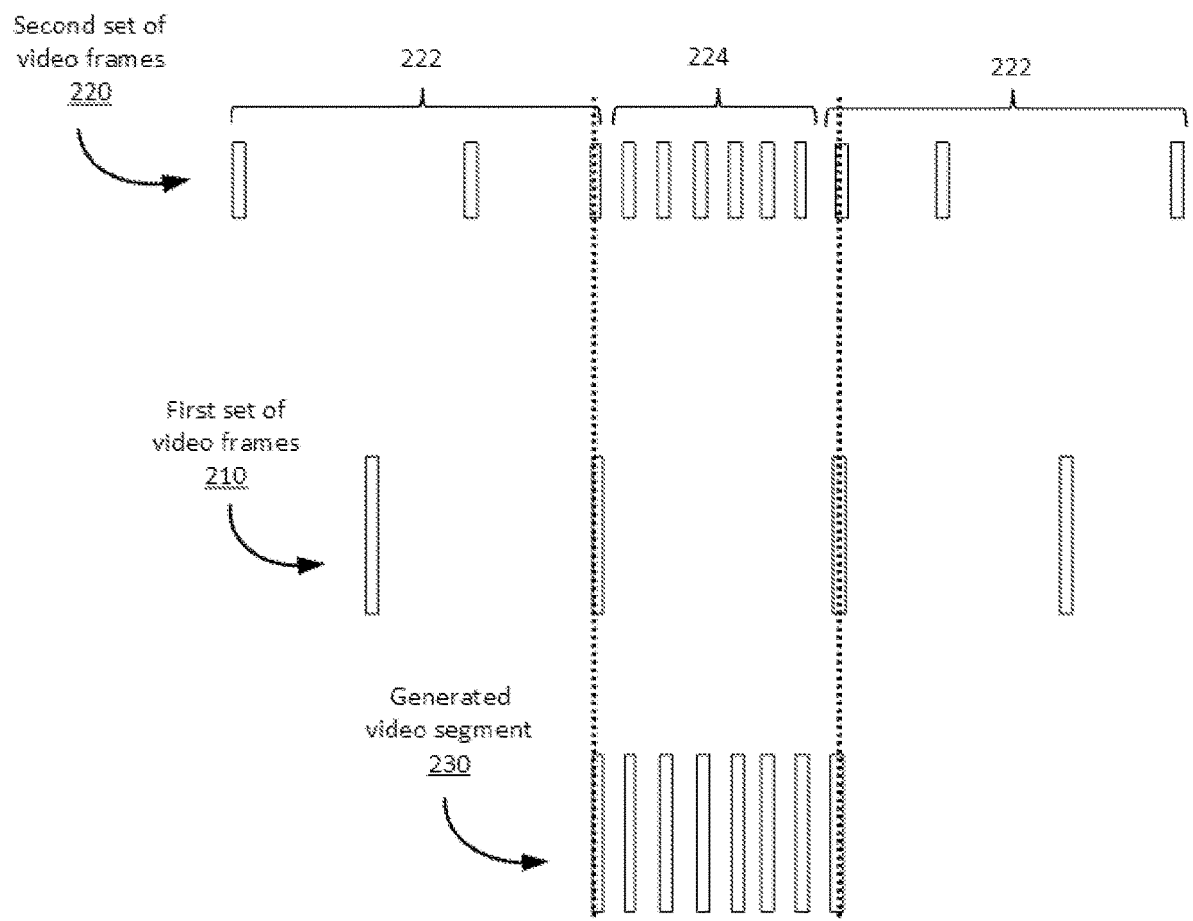
FIG. 3 is a diagram illustrating an example of generating a slow motion video segment by interpolation using a first set of high resolution, low frame rate captured video frames, and a second set of low resolution, variable frame rate captured video frames.

In the example of FIG. 2, the second set 220 of video frames is captured at a substantially constant frame rate. FIG. 3 is a diagram illustrating another example of generating a high-speed, high-definition video segment using the first set 210 and second set 220 of video frames, where the second set 220 of video frames has been captured using a variable frame rate. The second set 220 of video frames has been captured using a frame rate that is higher than the frame rate of the first set 210 of video frames, for at least a portion of the second set 220. In this example, the second set 220 includes a first portion 222 of frames captured at a lower frame rate than a second portion 224 of frames. The frame rate of the first portion 222 may be the same as or different from the frame rate of the first set 210 of video frames. It should be noted that the second frame rate within the first portion 222 and/or the second portion 224 need not be constant.

The first set 210 of video frames may be captured using the first camera 104, operating in a high resolution, low frame rate mode; and the second set 220 of video frames may be captured using the second camera 106, operating in a low resolution, variable frame rate mode. The variable frame rate of the second camera 106 may be dynamically adjusted, by the processing device 102 for example, based on motion detected in the video view (e.g., using instructions provided by the motion detection module 154). In some examples, the second camera 106 may be controlled to increase the frame rate proportional to the detected motion speed in the video view. In other examples, the second camera 106 may be controlled to increase the frame rate to one or more pre-set high frame rates when high-speed motion is detected. The use of dynamically variable frame rate to capture the second set 220 of video frames may enable more efficient use of resources (e.g., memory resources), compared to a constant high frame rate (e.g., as in the example of FIG. 2), because the high frame rate is triggered only when needed to capture high-speed motion.

Different techniques may be used to detect and/or predict motion in a video being recorded. In the present disclosure, detection of motion may be based on analysis of captured video frames, rather than a direct detection of motion (e.g., using motion sensors). As such, motion detection in the present disclosure may also be referred to as motion estimation. For simplicity, the present disclosure may generally refer to motion detection. In the present disclosure, motion detection may also include prediction or estimation of expected future motion. In some examples, such motion detection may be performed by controlling the second camera 106 to capture video frames at a moderate frame rate (which may be lower than the high frame rate used to capture the second portion 224 of video frames), and temporarily storing a moving window of the moderate frame rate video frames into a video buffer. The buffered frames may be processed (e.g., as discussed further below) to detect and/or predict high-speed motion in the video. If high-speed motion is detected and/or predicted, then the high frame rate may be triggered for the second camera 106.

Motion detection may be carried out by analyzing the entire area of a captured frame, or by analyzing only a portion of a captured frame. For example, segmentation techniques (e.g., foreground/background segmentation techniques) may be used to identify portion(s) of the frames containing a foreground object, and those portion(s) may be analyzed for high-speed motion. In another example, a user-selected or focused portion(s) of the frames may be used for motion detection. In another example, optical flow clustering or other computer vision techniques may be used to identify portion(s) of the frames containing a moving object, and those portion(s) may be analyzed for high-speed motion. In another example, AI techniques may be used to identify and label object(s) (e.g., a person) of interest in the frames, and the motion detection may be based on motion of the labeled object(s) in the frames.

Motion, including velocity and/or acceleration of an object for example, may be detected or estimated by calculating the optical flow of segmented objects and/or changes in pixel value from one frame to the next, for example. Acceleration of segment objects may be calculated and used to predict or estimate expected high-velocity motion, for example. Different motion detection and/or prediction techniques may be used. Some example motion detection methods that may be suitable are described by Kahina et al. "About Some Methods of Motion Detection and Estimation: A Review." *International Journal of Information and Electronics Engineering* 4.4 (2014): 274, incorporated herein by reference.

When the detected motion exceeds a predetermined speed threshold, for example, the motion may be considered high-speed motion and the high frame rate may be triggered. In some examples, the rate of the high frame rate may be further adjusted according to the magnitude of the detected and/or predicted motion (e.g., adjusted directly proportional to the speed of the detected and/or predicted motion). In some examples, the variable frame rate of the second camera 106 may be adjusted without using a speed threshold. That is, the second frame rate may be continually adjusted according to the detected and/or predicted motion, regardless of whether the motion meets a threshold speed.

In some examples, the second camera 106 may be controlled (e.g., triggered by the motion detection module 154) to capture low resolution, high frame rate video frames only. The second set 220 of video frames may thus include low resolution, high frame rate frames during time period(s) where high-speed motion is detected, and may not contain any frames during other time periods. That is, the second set 220 of video frames may not fully cover the time period covered by the first set 210 of video frames.

The second set 220 of video frames may be used together with the first set 210 of video frames to generate a slow motion video segment 230, for example using interpolation as described above. The interpolation calculations may not be affected by whether the second set 220 of video frames were captured at a variable frame rate (as in the example of FIG. 3) or at a constant frame rate (as in the example of FIG. 2).

In some examples, where the second set 220 of video frames were captured at a variable frame rate, there may be label(s) or indicator(s) of the time period(s) within the video where low resolution video frames in the second set 220 were captured using a high frame rate. Such information may indicate (e.g., the processing device 102 may query such information when executing the slow motion generation module 152) that interpolation performed for those time period(s) should be performed using both first and second sets 210, 220 of video frames. Such information may also be presented to the user (e.g., via a user interface provided on a display of the video capture device 100) to indicate that high-definition slow motion can be generated for those time period(s).

The example illustrated in FIG. 2, in which the second set 220 of frames are captured at a substantially constant frame rate, may be simpler to implement compared to the example illustrated in FIG. 3. On the other hand, the example illustrated in FIG. 3 may provide savings in storage size to store the second set 220 of video frames, because higher frame rate is used only to capture high-speed motion in the video. In both the examples of FIG. 2 and FIG. 3, savings in storage size and/or processing power may be achieved, compared to conventional techniques that rely on capturing high-speed, high-definition video.

Flowcharts are now described, which illustrate example methods for capturing video and generating slow motion video segments, as discussed above. The example methods of FIGS. 4A, 4B and 5 may be performed by the video capture device 100 of FIG. 1. For example, the processing device 102 may execute instructions stored in the memory 110 (e.g., in the slow motion generation module 152 and/or the motion detection module 154) to cause the video capture device 100 to perform the methods discussed herein.

Figure 4A:
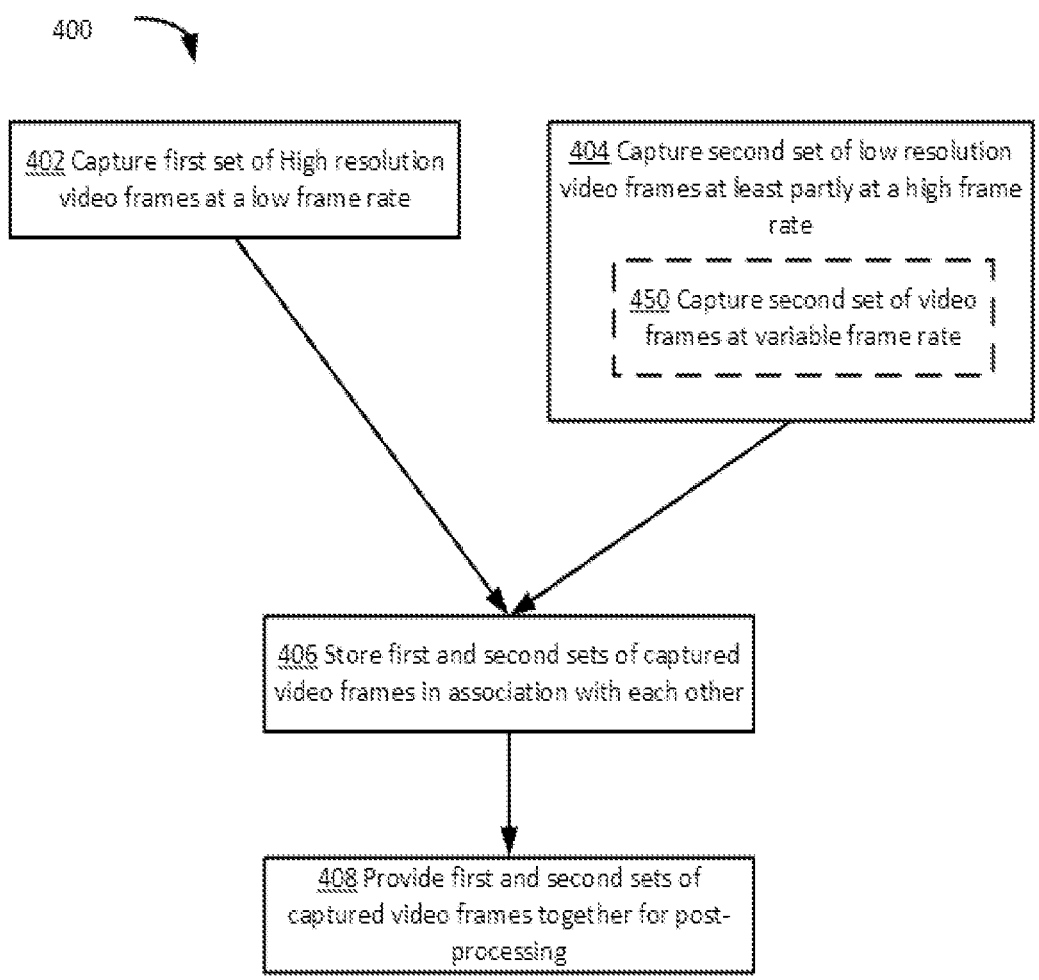
FIG. 4A is a flowchart of an example method for capturing a first set of high resolution video frames together with capturing a second set of low resolution video frames.

FIG. 4A is a flowchart of an example method 400 for capturing a first set of video frames and a second set of video frames, in accordance with an embodiment disclosed herein. The first set of video frames is captured at a first resolution and first frame rate, and the second set of video frames is captured at a second resolution, and at a second frame rate, where the second resolution is lower than the first resolution, and the second frame rate is greater than the first frame rate for at least a portion of the second set of video frames.

At 402, the first set of video frames is captured (e.g., using the first camera 104) at a high resolution and at a low frame rate (e.g., 24-30 FPS). The first set of video frames captures a video view (which may include multiple FOVs or scenes).

At 404, the second set of video frames is captured (e.g., using the second camera 106) at a low resolution and at least partly at a high frame rate (e.g., several hundred FPS and up to the maximum frame rate supported by the video capture device 100). The second set of video frames captures the same video view as the first set, and at the same time. That is, 402 and 404 are performed in parallel, for example by operating the first and second cameras 104, 106 together when capturing a video.

Optionally, at 450, capturing the second set of video frames may include capturing the second set using a variable frame rate. In this case, the second frame rate may be lower (e.g., lower than the first frame rate) for a first portion of the second set and may be higher (e.g., higher than the first frame rate) for a second portion of the second set. The variable frame rate of the second set of video frames may be varied over a wide range of values, for example from as low as 1-5 SFPS or lower to as high as 960 FPS or higher, depending on the video capture device 100.

At 406, the captured first and second sets of video frames are stored in association with each other. For example, the first and second sets of video frames may be stored (e.g., in the data storage 112 of the video capture device 100) as two separate and associated files, or as a single file.

Storing the first and second sets of video frames may include storing information to enable the first and second sets of video frames to be aligned with respect to each other, for example by including a relative timestamp so that each frame in the second set can be temporally related to at least one frame in the first set, and vice versa. Such information may enable later identification of one or more frames in the second set that correspond to an inter-frame time period between two frames in the first set, when performing interpolation for example.

At 408, the first and second sets of video frames are provided together for post-processing. For example, the first and second sets of video frames may be provided for generating a slow motion video segment.

Figure 4B:
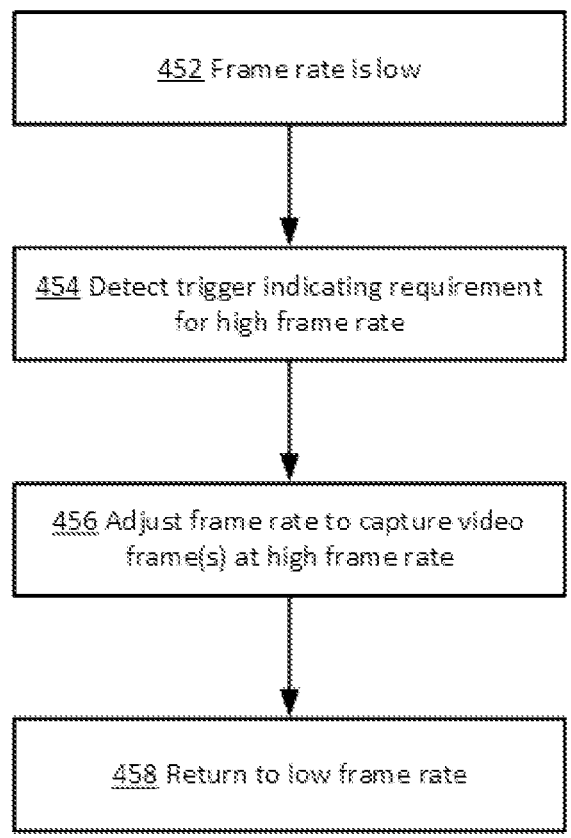
FIG. 4B is a flowchart of an example method for capturing a second set of low resolution video frames using a variable frame rate.

FIG. 4B is a flowchart of an example method 450 for capturing the second set of video frames using a variable frame rate.

At 452, the method begins with the second frame rate being a lower frame rate. The second frame rate may be set to be at the lower frame rate by default. The lower frame rate at 452 may be the same as the "normal" frame rate (e.g., 24-30 FPS) used by the first set of video frames or lower (e.g., 10 FPS). Lower definition video frames may or may not be captured at this lower frame rate.

At 454, a trigger is detected indicating the requirement for the second frame rate to be at a high frame rate. For example, the trigger may be detection and/or prediction of motion of an object in the video view that is at or above a predetermined speed or acceleration threshold. Motion detection may include estimation of motion of one or more objects in the video view, and may include calculations performed on video frames in a temporary buffer. Motion detection may be performed using any suitable technique, for example using optical flow segmentation and clustering, or AI-based techniques as discussed above.

At 456, the second frame rate is dynamically adjusted to capture one or more video frames at a high frame rate. In some examples, the second frame rate may be dynamically adjusted proportional to the speed of the detected and/or predicted motion.

At 458, the second frame rate returns to the low frame rate. For example, when motion above the speed or acceleration threshold is no longer detected and/or predicted, the second frame rate may be dynamically adjusted to return to the low frame rate. In some examples, where a threshold value is used as the basis for using or not using a high frame rate, a first threshold value may be used to trigger using a high frame rate and a different second threshold value may be used to trigger return to the low frame rate, so that a hysteresis effect is implemented. The use of different threshold values may be useful to avoid rapid switching of frame rates.

Figure 5:
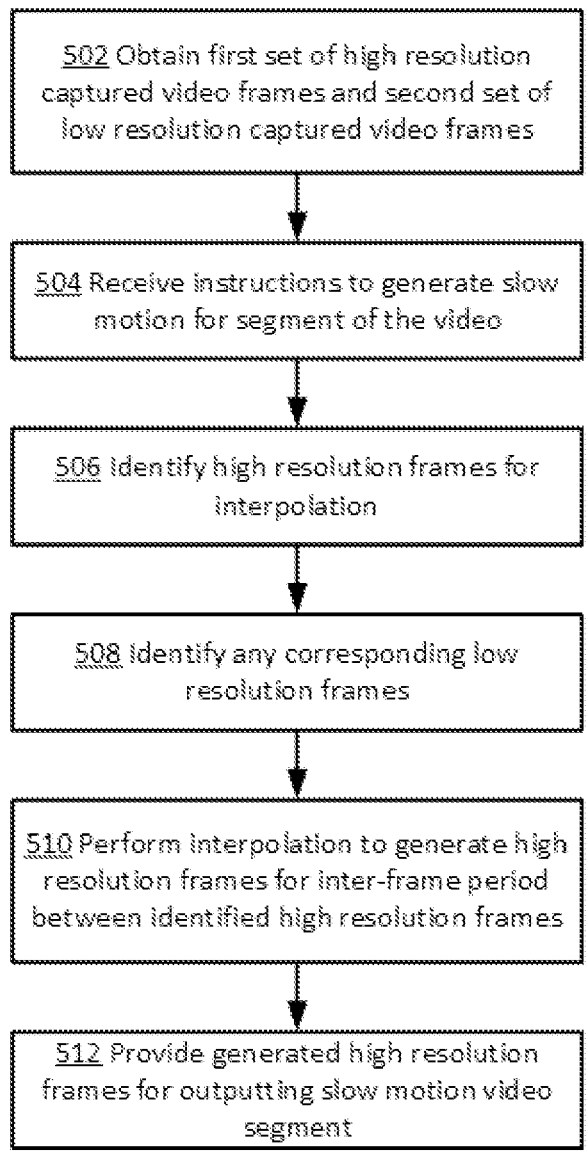
FIG. 5 is a flowchart of an example method for generating a slow motion video segment using a first set of high resolution video frames and a second set of low resolution video frames.

FIG. 5 is a flowchart of an example method 500 for generating a slow motion video segment using a high definition video comprising a first set of high resolution video frames and a low definition video comprising a second set of low resolution video frames. In some examples, the method 500 may be performed independently of the method 400 (and optional method 450). For example, the method 500 may be performed by an image post-processing device separate from a video capture device that performed the method 400 (and optionally the method 450).

At 502, the high definition video comprising the first set of video frames and the low definition video comprising the second set of video frames are obtained. The high definition video is obtained at a first resolution and at a first frame rate, and the second set of video frames is at a second resolution, which is lower than the first resolution, and a second frame rate, which is greater than the first frame rate for at least a portion of the second set. Where the method 500 is performed by the same device (e.g., the video capture device 100) that captured the high and low definition videos, the first and second sets may be obtained by retrieving the first and second sets from locally stored high definition and low definition videos, respectively (e.g., stored in the data storage 112). Obtaining the first and second sets may include capturing the first and second sets of video frames, for example using the method 400 (and optionally the method 450). In other examples, obtaining the first and second sets may include requesting the first and second sets from an external device, such as an external database or an external video capture device. The first set of frames may be a portion of the captured high definition video, and the second set of frames may be a portion of the captured low definition video. That is, in some examples the first and second sets of frames may be a subset of the total frames of the respective videos.

At 504, instructions are received to generate slow motion for a segment of the video. For example, a user may select (e.g., via a user interface presented on a touchscreen of the video capture device 100) a point in the video where slow motion should begin. The user may also select a time period in the video for which slow motion should be generated. If the instructions do not indicate a time point when slow motion should end, slow motion may be automatically generated for a length where there is detected high-speed motion in the video (e.g., detected by analyzing pixel or object flow in the frames, or based on labels applied to the video frames when the video was captured).

At 506, two or more high resolution frames are identified from the first set of video frames for performing interpolation, in order to generate the slow motion video segment. The identified high resolution frames may be identified by identifying at least two frames from the first set of video frames that spans the time period for which the slow motion is to be generated. In some cases, more than two high resolution frames may be identified, for example where the slow motion video segment is to be generated for a time period that is longer than the time period between frames.

At 508, it is identified whether there are one or more low resolution frames that correspond to the inter-frame time period between the two high resolution frames. The low resolution frame(s) may be identified using timestamp information, for example, temporally relating the frames in the second set to the identified high resolution frames. In some cases, such as where the second set of video frames has been captured using a variable frame rate, there may not be a low resolution frame corresponding to the inter-frame time period (e.g., because the frame rate of the second set during that time period was less than the frame rate of the first set). For example, if the slow motion video segment is to be generated for a time period in the video segment where there is no high speed motion detected, the second set of video frames may not have been captured at a high frame rate for that time period.

At 510, interpolation is performed (e.g., using instructions in the slow motion generation module 152) to generate high resolution frames for the inter-frame period between the identified high resolution frames. When at least one low resolution frame has been identified at 508, the interpolation is performed using both the identified high resolution frames and the identified low resolution frame(s). If no low resolution frame has been identified at 508 then the interpolation is performed using the identified high resolution frames only. Any suitable interpolation technique may be used, for example linear interpolation (e.g., using equations provided above), AI-based interpolation or filter-based interpolation, among other possibilities. Where there are more than two high resolution frames that have been identified at 506, the interpolation may be performed for each pair of temporally adjacent high resolution frames, for example.

In some examples, artificial intelligence or deep neural nets may be used to implement various aspects disclosed herein. For example, a deep neural net may be used to learn and predict high-speed motion in a captured video, in order to vary the frame rate when capturing the second set 220 of low resolution video frames. A deep neural (or other machine learning techniques) may be used to perform interpolation for generating a slow motion video segment, instead of the linear interpolation described in examples above.

At 512, the generated high resolution frames are provided in order to output the generated slow motion video segment. For example, the generated high resolution frames may be provided to be displayed by a display device of the video capture device 100, as a slow motion video segment alone or within a longer video. The generated high resolution frames may also be stored in memory or outputted to another device, for example.

It should be understood that the example embodiments disclosed herein may also be extended to implementation using more than two sets of captured video frames. For example, a video capture device 100 may include the third camera 108 for capturing a third video comprising a set of video frames. The third video may be captured at a resolution that is different from the resolution of the first and second videos, and a frame rate that is different from the frame rates of the first and second videos. The third video may be captured using a variable frame rate, for example. Both the third video and the second video may be captured using a variable frame rate. The speed threshold used for triggering increase of the frame rate in the third set of video frames may be different than the speed threshold used for triggering increase of the frame rate in the second set of video frames. For example, the third video may be captured at a third resolution that is lower than the resolution of the second video, and at a third frame rate that is higher than the frame rate of the second video, for at least a portion of the third video. The slow motion generation described above may thus be based on three (or more) sets of video frames having, for example, coarse, intermediate and fine spatial resolutions, with fast, moderate and low frame rates, respectively. The interpolation may then be performed using the three (or more) sets, for example by extending the linear interpolation described above to three (or more) sets of video frames. One technique may be to use a tiered iterative approach, where interpolation may be first performed using the set of highest resolution frames and the set of next-highest resolution frames, then the result of the first interpolation may be used together with the set of third-highest resolution frames in another round of interpolation. One can appreciate that such interpolation may be extended to any desired number of sets of video frames captured at different video definitions and/or different frame rates.

In an example where the third camera 108 is used to capture a third set of video frames, the third camera 108 may be controlled to capture video frames at a higher frame rate and a lower resolution than the second camera 106. The second and third sets of video frames may be used to generate an intermediate slow motion video segment, using example method 500 described above. The intermediate slow motion video segment may be combined with the first set of frames captured by the first camera (at the lowest frame rate and highest resolution) to generate the final slow motion video segment, again using example method 500 described above. Thus, the slow motion video segment may be generated recursively. In an example of recursion, if the example method 500 is implemented as a function DualChannelSlowMotion that receives two sets of video frames, then the slow motion video segment may be generated as:
DualChannelSlowMotion(camera1, DualChannelSlowMotion (camera2, camera3))
where camera1 denotes the first set of video frames captured by the first camera, camera2 denotes the second set of video frames captured by the second camera, and camera3 denotes the third set of video frames captured by the third camera. It will be understood that the method may be similarly extended to be implemented using four or more cameras. Other approaches (e.g., using iterations) may be used to extend the method to be implemented using more cameras.

Various examples of the present disclosure may provide one or more advantages over conventional video capture techniques.

In some examples of the present disclosure, the motion speed and/or acceleration of objects in a video being captured may be estimated in real-time, and the frame rate of the video may be dynamically adjusted while capturing the video. Thus, the need to pre-select a high-speed or slow-motion shooting mode to capture high-speed or slow-motion videos may be avoided. The requirement of large storage space for storing a high-speed, high-definition video (as required by conventional video capture devices) may also be avoided.

In some examples of the present disclosure, generation of slow motion video segments in post-processing may be improved compared to conventional techniques. A user may be able to generate a high-definition slow motion video segment from any segment of a captured video, by combining a set of high resolution video frames captured at a standard speed (e.g., 24-30 FPS) with a set of low resolution video frames captured at least partly in a higher speed (e.g., up to 960 FPS).

In some examples, the set of low resolution video frames may be at a substantially constant higher frame rate. This may avoid the need to detect motion in real-time during video capture. In other examples, the low definition video comprising a set of low resolution video frames may be captured at a variable frame rate, which may provide further memory savings.

Examples of the present disclosure may be implemented in self-driving devices such as autonomous vehicles. In autonomous vehicles for example, examples of the present disclosure may help to enable more accurate video analysis by facilitate acquisition of high speed, high definition videos at a lower storage cost, thus enabling more precise and accurate input (in both spatial and temporal domains) for autonomous driving. In some examples, capturing the first and second sets of video frames may be performed separately from generating the slow motion video segment, and may be performed by different devices.

The present disclosure, in various examples, describes the high definition video comprising a first set of high resolution frames being captured by a first camera, and the low definition video comprising the second set of low resolution frames being captured by a second camera. However, the first camera is not necessarily limited to pturing high definition video; similarly, the second camera is not necessarily limited to capturing low definition video.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a computer program product or software product. A suitable software product may be stored in a pre-recorded storage device or other similar non-volatile or non-transitory computer readable medium, including DVDs, CD-ROMs, USB flash disk, a removable hard disk, or other storage media, for example. In some examples, the software product is downloadable from a server and can be installed on a processing system, such as processing system 200. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A device for generating a slow motion video segment, the device comprising:
   a memory;
   a processor coupled to the memory and configured to execute computer-readable instructions to cause the device to:
      receive a first video capturing a video view at a first resolution and at a first frame rate;
      receive a second video capturing the video view at a second resolution, lower than the first resolution, and at a second frame rate, the second frame rate being a variable frame rate;
      estimate a speed of motion of an object in the video view;
      in response to the estimated speed being at or above a defined speed threshold, control the second frame rate to be at a high frame rate that is greater than the first frame rate;
      vary the second frame rate to be proportional to the estimated speed;
      store, in the memory, the received first video as a first set of video frames;
      store, in the memory, the received second video as a second set of video frames; and
      in response to instructions to generate the slow motion video segment:
         identify at least two high resolution frames in the first set for generating the slow motion video segment;
         identify whether there is at least one low resolution frame in the second set corresponding to an inter-frame time period between the identified at least two high resolution frames; and
         when there is at least one low resolution frame corresponding to the inter-frame time period, generate the slow motion video segment by generating at least one high resolution frame corresponding to the inter-frame time period using interpolation based on the identified at least two high resolution frames and the at least one low resolution frame; and
   an output device coupled to the processor for displaying the slow motion video segment using the at least one generated high resolution frame.

2. The device of claim 1, wherein the processor is further configured to execute instructions to cause the device to generate the at least one high resolution frame using a linear interpolation.

3. The device of claim 1, wherein the instructions to generate the slow motion video segment include an indication of a time period for generating the slow motion video segment, and wherein the processor is further configured to execute instructions to cause the device to identify the at least two high resolution frames by identifying at least two frames in the first set spanning the indicated time period.

4. The device of claim 1 further comprising:
   a first camera for capturing the first video; and
   a second camera for capturing the second video;
   wherein the processor is coupled to the first and second cameras to control operation of the first and second cameras; and
   wherein the first and second cameras are provided on a same side of the device.

5. The device of claim 1, wherein the second frame rate is higher than the first frame rate for a portion of the second set.

6. The device of claim 1, wherein the second frame rate is substantially constant for all of the second set of video frames.

7. The device of claim 1, wherein the first and second sets of video frames are stored in the memory in association with each other.

8. The device of claim 7, wherein each frame in the second set of video frames includes a relative timestamp providing temporal relation to at least one frame in the first set of video frames.

9. The device of claim 1, wherein the memory further stores a third set of video frames, the third set capturing the video view at a third resolution and at a third frame rate, the third resolution being lower than the second resolution, and the third frame rate being greater than the second frame rate for at least a portion of the third set, and wherein the processor is further configured to execute instructions to cause the device to:
   generate the slow motion video segment recursively by:
      generating a set of intermediate slow motion video frames, having an intermediate resolution, using the second and third sets of video frames; and
      generating the slow motion video segment using the set of intermediate slow motion video frames and the first set of video frames.

10. The device of claim 1, wherein to estimate the speed of motion of the object in the video view, the computer-readable instructions further cause the device to:
    control the second frame rate to be a moderate frame rate that is lower than the high frame rate;
    store a moving window of the second set of video frames in a video buffer as buffered frames; and
    process the buffered frames to detect a magnitude of high-speed motion in the video view.

11. The device of claim 10, wherein processing the buffered frames includes analyzing an entire area of each buffered frame.

12. The device of claim 10, wherein processing the buffered frames includes analyzing only a portion of each buffered frame.

13. A method for generating a slow motion video segment, the method comprising:
    receiving a first video capturing a video view at a first resolution and at a first frame rate;

receiving a second video capturing the video view at a second resolution, lower than the first resolution, and at a second frame rate, the second frame rate being a variable frame rate;

estimating a speed of motion of an object in the video view;

in response to the estimated speed being at or above a defined speed threshold, controlling the second frame rate to be at a high frame rate that is greater than the first frame rate;

varying the second frame rate to be proportional to the estimated speed;

storing the received first video as a first set of video frames;

storing the received second video as a second set of video frames; and in response to instructions to generate the slow motion video segment:

identifying at least two high resolution frames in the first set for generating the slow motion video segment;

identifying whether there is at least one low resolution frame in the second set corresponding to an inter-frame time period between the identified at least two high resolution frames;

when there is at least one low resolution frames corresponding to the inter-frame time period, generating the slow motion video segment by generating at least one high resolution frame corresponding to the inter-frame time period using interpolation based on the identified at least two high resolution frames and the at least one low resolution frame; and providing the at least one generated high resolution frame to an output device to display the slow motion video segment.

14. The method of claim 13, wherein the interpolation is a linear interpolation.

15. The method of claim 13, wherein the instructions to generate the slow motion video segment include an indication of a time period for generating the slow motion video segment, and wherein identifying the at least two high resolution frames includes identifying at least two frames in the first set spanning the indicated time period.

16. The method of claim 13, further comprising:
capturing the first video using a first camera; and
capturing the second video using a second camera;
wherein first and second cameras are provided on a same side of a video capture device.

17. The method of claim 13, wherein the second frame rate is substantially constant for all of the second set of video frames.

18. The method of claim 13, further comprising storing the first and second sets of video frames in a memory in association with each other.

19. The method of claim 13, further comprising:
obtaining a third set of video frames, the third set capturing the video view at a third resolution and at a third frame rate, the third resolution being lower than the second resolution, and the third frame rate being greater than the second frame rate for at least a portion of the third set;

in response to instructions to generate the slow motion video segment:

generating the slow motion video segment recursively by:

generating a set of intermediate slow motion video frames, having an intermediate resolution, using the second and third sets of video frames; and generating the slow motion video segment using the set of intermediate slow motion video frames and the first set of video frames.

20. A non-transitory computer-readable medium having machine-executable instructions stored thereon, the machine-executable instructions, when executed by a processor of a device, cause the device to:

receive a first set of video frames capturing a video view at a first resolution and at a first frame rate;

receive a second set of video frames capturing the video view at a second resolution, lower than the first resolution, and at a second frame rate, the second frame rate being a variable frame rate;

estimate a speed of motion of an object in the video view;

in response to the estimated speed being at or above a defined speed threshold, control the second frame rate to be at a high frame rate that is greater than the first frame rate;

vary the second frame rate to be proportional to the estimated speed;

store the received first set of video frames as a first set of video frames;

store the received second set of video frames as a second set of video frames; and in response to instructions to generate a slow motion video segment:

identify at least two high resolution frames in the first set for generating the slow motion video segment;

identify whether there is at least one low resolution frame in the second set corresponding to an inter-frame time period between the identified at least two high resolution frames;

when there is at least one low resolution frame corresponding to the inter-frame time period, generate the slow motion video segment by generating at least one high resolution frame corresponding to the inter-frame time period using interpolation based on the identified at least two high resolution frames and the at least one low resolution frame; and provide the at least one generated high resolution frame to an output device to display the slow motion video segment.

* * * * *